United States Patent [19]
Klanchar et al.

[11] Patent Number: 5,867,978
[45] Date of Patent: Feb. 9, 1999

[54] SYSTEM FOR GENERATING HYDROGEN

[75] Inventors: Martin Klanchar; Thomas G. Hughes, both of State College, Pa.

[73] Assignee: The Penn State Research Foundation, University Park, Pa.

[21] Appl. No.: 853,284

[22] Filed: May 9, 1997

Related U.S. Application Data

[63] Continuation-in-part of Ser. No. 566,486, Dec. 4, 1995, Pat. No. 5,634,341.

[51] Int. Cl.$^6$ ..................................................... F02C 6/00
[52] U.S. Cl. ...................... 60/39.182; 423/657; 165/169; 60/39.12
[58] Field of Search ......................... 423/657, DIG. 12; 60/39.182, 39.12; 429/12, 26; 165/169

[56] References Cited

U.S. PATENT DOCUMENTS

| | | | |
|---|---|---|---|
| 2,706,890 | 5/1955 | Schmidt | 60/50 |
| 3,353,349 | 11/1967 | Percival | 60/37 |
| 3,413,801 | 12/1968 | Meijer et al. | 60/24 |
| 3,508,394 | 4/1970 | De Nagel et al. | 60/24 |
| 3,821,362 | 6/1974 | Spacil | 423/657 |
| 3,943,719 | 3/1976 | Terry et al. | 60/644 |
| 3,975,913 | 8/1976 | Erickson | 60/645 |
| 3,985,866 | 10/1976 | Oda et al. | 423/657 |
| 4,050,250 | 9/1977 | Danis | 60/517 |
| 4,205,720 | 6/1980 | Epstein | 165/169 |
| 4,643,166 | 2/1987 | Hubele et al. | 126/263 |
| 4,698,974 | 10/1987 | Wood | 60/673 |
| 4,730,601 | 3/1988 | Hubele et al. | 126/263 |
| 4,851,722 | 7/1989 | Zauderer | 310/11 |
| 5,117,635 | 6/1992 | Blau | 60/668 |
| 5,593,640 | 1/1997 | Long et al. | 423/657 |

FOREIGN PATENT DOCUMENTS 52-27626 7/1977 Japan.

Primary Examiner—Noah P. Kamen
Attorney, Agent, or Firm—Thomas J. Monahan

[57] ABSTRACT

A process and apparatus are disclosed for generating hydrogen gas from a charge of fuel selected from the group consisting of lithium and alloys of lithium and aluminum. The charge of fuel is placed into an enclosed vessel, then heated until it is molten. A reactant consisting of water is introduced into the vessel, as by spraying from a nozzle, for reaction with the charge of fuel resulting in the production of hydrogen gas and heat which are withdrawn from the vessel. Prior to initiation of the process, an inert gas atmosphere, such as argon, may be imparted to the interior of the vessel. A sufficiently large mass flow of the reactant through the nozzle is maintained to assure that there be no diminution of flow resulting from the formation on the nozzle of fuel and chemical compounds of the fuel. Optimum charges of the fuel are application specific and the ranges of the constituents are dependent upon the particular use of the system. The process and apparatus of the invention may be incorporated into a Rankine cycle engine or into a hydrogen oxygen fuel cell system.

25 Claims, 11 Drawing Sheets

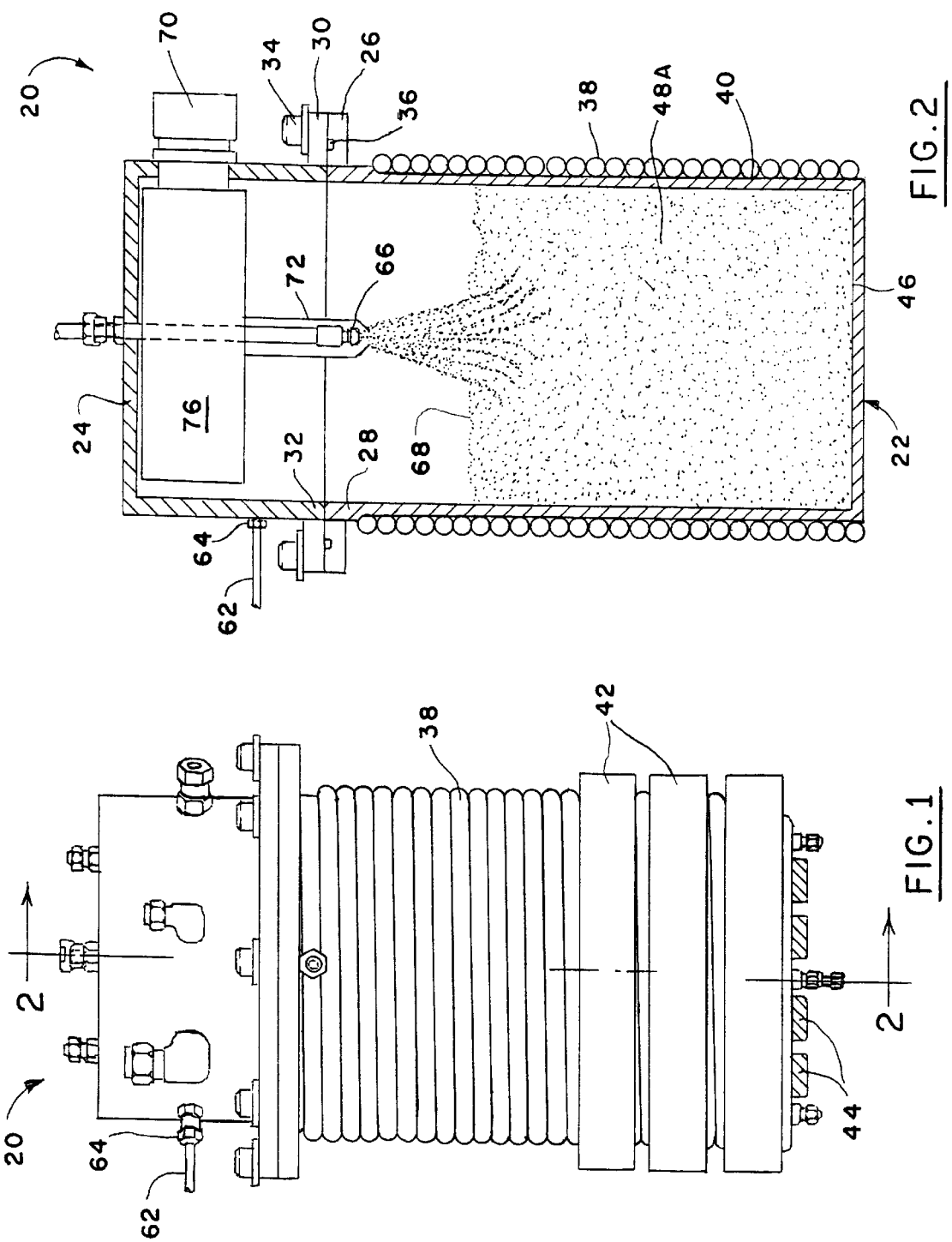

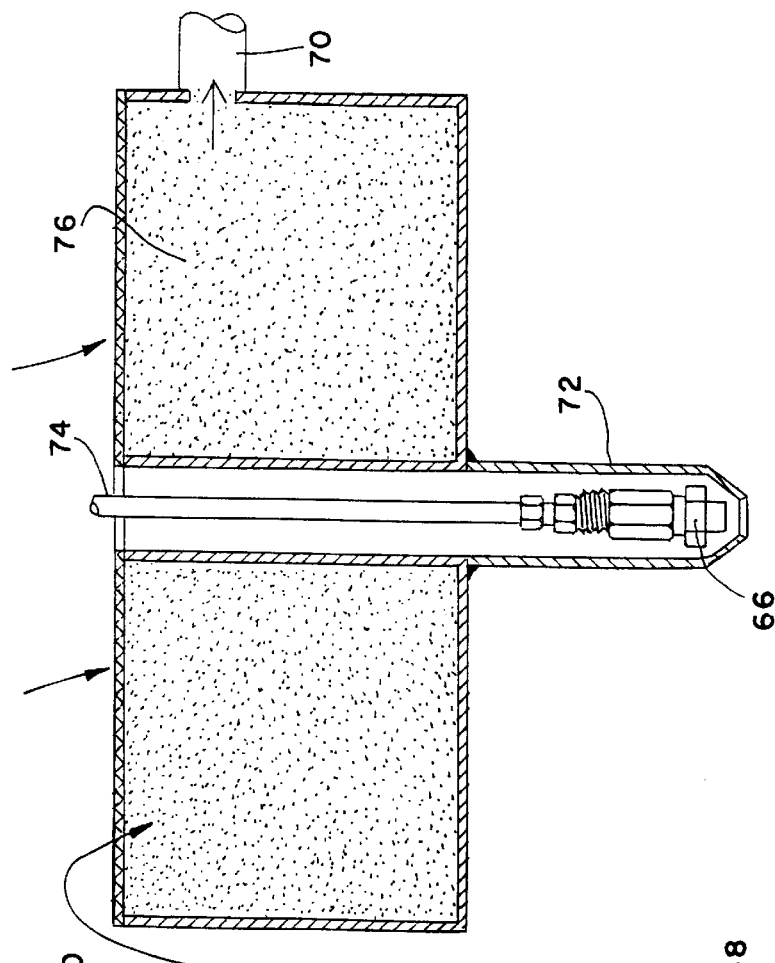
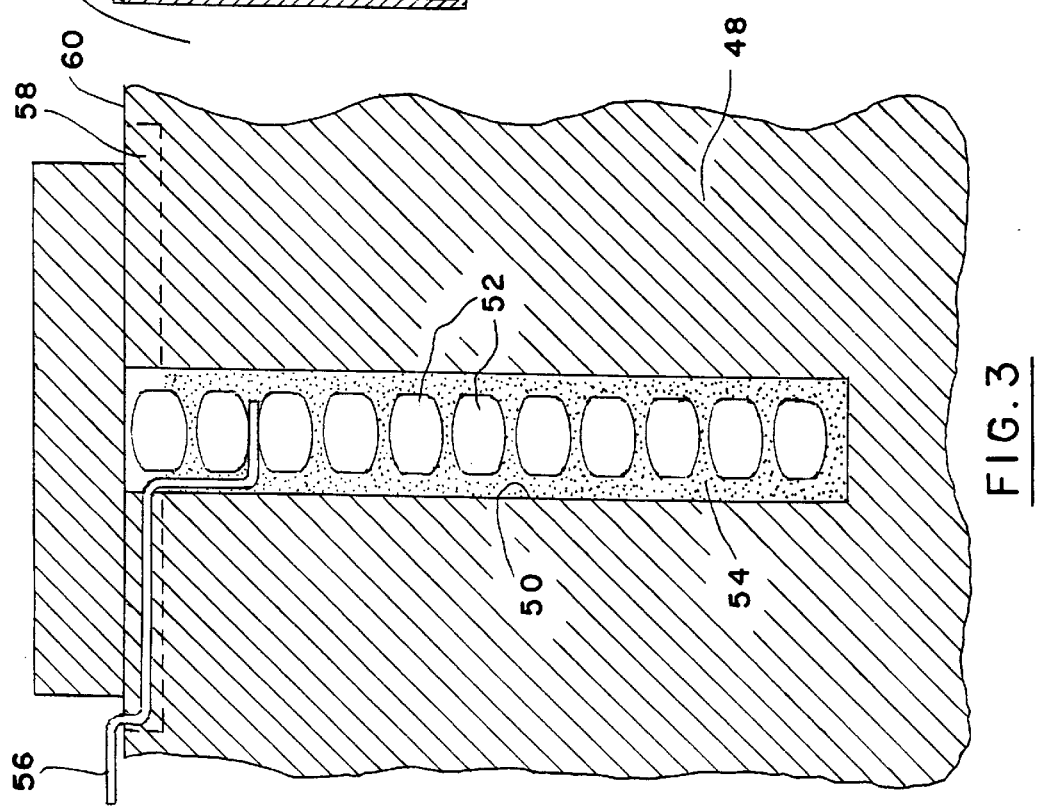

SYSTEM FOR GENERATING HYDROGEN

This disclosure is a continuation-in-part of application Ser. No. 08/566,486 filed Dec. 4, 1995, now U.S. Pat. No. 5,634,341.

GOVERNMENT SPONSORSHIP

This invention was made with Government support under Contract N00039-88-C-0051 awarded by the U.S. Department of the Navy. The Government has certain rights in this invention.

BACKGROUND OF THE INVENTION

1. Field of the Invention

The present invention relates generally to hydrogen gas, generating systems and, more particularly, to a system for the generation of hydrogen gas resulting from the reaction of molten lithium or lithium alloy fuel with water in a contained vessel.

2. Discussion of the Prior Art

The hydrogen gas generator reactor of the present invention is one of the key energy producing components of a Rankine cycle vapor pressure or steam engine, for example, which obtains its driving heat energy from a chemical reaction other than the usual combustion of fuel with oxygen from the air. The theoretical possibility of utilizing the reaction energy of a reactive metal fuel such as aluminum, magnesium or lithium and alloys or hydrides of these and similar reactants, with an "oxidizer" such as hydrogen peroxide, Freons, sulfur hexaflouride, water and others, has been recognized for many years. However, the technical difficulties and conflicts standing between a theoretical construction of such a power system and a practical apparatus which is functional outside of the laboratory are legion.

By way of example, many of the fuel-reactant combinations proposed in the past have required that the fuel be raised above ordinary ambient temperatures in order to permit reaction with the reactant. Such a heating requirement necessitates that some heating means, such as electrical heating coils or pyrotechnic chemicals be provided. In the former case, a significant start-up delay is incurred while a portion or all of the fuel is raised to reaction temperature. In the latter case, the pyrotechnic chemicals, which are or may be considered to be low velocity explosives, present the possibility of damaging the interior of the reaction chamber and escape of highly reactive or toxic fuels. Such pyrotechnic heating chemicals also frequently produce a quantity of gaseous reaction products which must be contained within the reaction chamber, or else vented therefrom while preventing loss of fuel.

Another undesirable aspect of many previously proposed fuel-reactant systems is that intermediate reaction products or end reaction products are formed which on the one hand inhibit further progress of the reaction between the fuel and reactant or, on the other hand, freeze at a temperature higher than the desired reaction chamber temperature. In the one case, complex structures and methods have been proposed to cure the shortcoming by removing the intermediate or final reaction product from the reaction chamber. Alternatively, only a portion of the fuel could be brought into contact with the reactant so that reaction products could not contaminate the remaining fuel. Again, complexity is increased.

The problem of the reaction intermediates or final products freezing at too high a temperature presents the difficulty that the reaction chamber may soon become filled with a "slush" of frozen reaction products in a slurry of molten fuel. Similarly, the high-freezing constituents present in the reaction chamber may form a "frost" or crust on the coolest surfaces present. These cool surfaces will ordinarily be heat transfer surfaces where it is desired to transfer heat from the chemical reaction for utilization in a steam or vapor pressure Rankine cycle engine. Such a crust on the heat transfer surfaces will ordinarily have a relatively high insulation value in comparison with the molten fuel. As a result, the crusted reaction products themselves progressively inhibit heat transfer from the reaction chamber to the engine.

One approach aimed at solving the problem just mentioned is disclosed in U.S. Pat. No. 4,698,974 to Wood. In the Wood disclosure, a fuel is reacted with water in the absence of oxygen gas to produce heat and hydrogen gas. The heat from this reaction is sued to produce water steam. The hydrogen gas is burned with oxygen gas in a separate second reaction chamber to produce super heated steam. The steam from the first reaction chamber is used as a coolant and diluent in the second reaction chamber so that steam flowing from the second reaction chamber to a turbine, or other expander, has a metallurgically acceptable temperature.

A shortcoming of the Wood invention, however, is that a hydrogen gas bearing reaction intermediate is formed which initially partially prevents the evolution of the hydrogen gas from the first reaction chamber. As the reaction progresses, the reaction intermediate further reacts to release the bound hydrogen. The result is that over the period of the reaction, the rate of hydrogen gas production is at first relatively low, reaches a stable plateau, and then raises above the plateau as the fuel supply is consumed.

A consequence of this nonuniform rate of hydrogen gas production is that the power output of the Rankine cycle steam engine is relatively low initially and cannot be increased until the hydrogen gas production rate of the chemical reaction chamber increases. Understandably, this sluggish initial power output of such a system is undesirable in almost every prospective application. Additionally, the nonuniform rate of hydrogen gas production creates many difficulties in controlling the power output level of the Rankine cycle engine.

An improvement on the Wood system is presented in U.S. Pat. Nos. 4,643,166 and 4,730,601 to Hubele et al which, according to one aspect, provides a two-part fuel composition including a first or main fuel part of magnesium and aluminum in a molar ratio of 1:2, respectively. The second or starter fuel part is composed of lithium hydride, magnesium and aluminum in equal molar ratio. On a weight basis, the starting fuel composition and main fuel composition are presented at a ratio of about 1:4. In the reaction chamber, the above-outlined fuel is present in the form of prealloyed powders produced, for example, from condensed vaporized or atomized metal. The reaction chamber structure provides in addition to heat transfer means, a means for introducing water into the chamber for reaction with the fuel.

In one embodiment, the means for introducing water comprises a manifold with foraminous distribution tubes depending in the fuel. The distribution tubes are immediately surrounded by a comparatively thin layer of the starting fuel part. The main fuel part is received within the reaction chamber around the distribution tubes and layer of starting fuel part.

In another embodiment, the main fuel part is disposed in a lower portion of the reaction chamber. In an upper portion of the reaction chamber is disposed an appropriate quantity of the starting fuel part and, in this instance, the reaction chamber includes a water inlet nozzle disposed in an upper part of the reaction chamber above both the starting and main fuel parts. Preferably, the water nozzle is separated from the fuel during operation of the reaction chamber and engine.

A primary advantage of the patented system as mentioned therein is the stated absence of any need or requirement to provide fuel preheating before the reaction chamber is operational. According to a further stated advantage, the introduction of simple water is all that is required to initiate operation of the reaction chamber to produce both heat and a supply of hydrogen. This latter feature is said to be of particular advantage when the invention is sued in connection with a water borne vehicle.

However, the Hubele et al. invention exhibits a number of drawbacks. Specifically, the disclosures in the Hubele et al. patents relate the use of two separate and distinct fuels and, furthermore, do not require that the fuels be raised in temperature to a molten mass as does the present invention. Indeed, those patents stress the desirability of a reaction which is performed at common ambient temperatures and which do not require preheating or pyrotechnic chemicals to be used in starting the reaction. While the Hubele et al. patents imply that there is a strategic advantage to starting at room temperature and to reacting a starting charge first and, subsequently, the main fuel, they also state that the entire fuel mass will melt in very short order. In effect, what will occur is that the operator of the Hubele et al. system will not be able to control the local reaction to first use the start charge with the result that a molten mass will be achieved with only one fuel, not two, and the stated claim of a regulated, flat, hydrogen gas production will not be achieved.

Other patents of interest include U.S. Pat. No. 3,353,349 to Percival and U.S. Pat. No. 5,117,635 to Blau. Percival discloses a closed cycle thermal engine provided with a combustion system for heating the working gas thereof. The combustion system produces nongaseous byproducts and operates at substantially constant volume by employing molten lithium or sodium as a fuel and certain gaseous nonhydrogen containing Freon-type fluorocarbon compounds as the oxidizer. Blau describes an open-cycle Rankine steam engine. One of the energy-producing components of the engine does utilize molten lithium as a fuel. However, hydrogen gas is not generated anywhere within the system.

SUMMARY OF THE INVENTION

It was in light of the prior art as just described that the present invention was conceived and has now been reduced to practice. The present invention, then, relates to a process and to apparatus for generating hydrogen gas from a charge of fuel selected from the group consisting of lithium, and alloys of lithium and aluminum, and alloys of lithium and aluminum and lithium hydride, and alloys of lithium and lithium hydride. These alloys were selected primarily because their reaction with water produces relatively large amounts of hydrogen gas and heat per storage (reactor vessel) volume. In addition, the kinetics of the reaction are very fast—essentially instant and irreversible. Also, post-run cleanout of the vessel is relatively safe and easy since the remaining products of reaction (metal oxides) are typically nontoxic and water soluble.

The charge of fuel is placed into an enclosed vessel, then heated until it is molten. A reactant consisting of water is introduced into the vessel, as by spraying from a nozzle, for reaction with the charge of fuel resulting in the production of hydrogen gas and heat which are withdrawn from the vessel. Prior to initiation of the process, an inert gas atmosphere, such as argon, may be imparted to the interior of the vessel. A sufficiently large mass flow of the reactant through the nozzle is maintained to assure that there be no diminution of flow resulting from the formation on the nozzle of fuel and chemical products of the fuel. Optimum charges of the fuel are application specific and the ranges of the constituents are dependent upon the particular use of the system. The process and apparatus of the invention may be incorporated into a Rankine cycle engine or into a hydrogen oxygen fuel cell system.

In an improved system, at least in some instances, suitable cooling water tubing is installed so as to be completely inside a heavy-duty pressure vessel which is sized to withstand anticipated pressure and temperature conditions, typically, up to about 550 psia and 2000° F. Also, further testing with respect to hydrogen generation led to the development of a two-part reaction model. The first part or phase is assumed to be a LiH formation stage where LiH accumulates as an intermediate reaction product in the fuel bath. This reaction produces relatively high heat of reaction per water injected (9171 BTU/lb water reacted at 2000° F.) compared to other possible mechanisms, and thus has the potential to generate high rates of steam. As this reaction occurs, LiH accumulates in the bath along with unreacted Li, Al, and their metal oxides. Equilibrium modeling predicts that the bath will reach a LiH saturation condition when the molar ratio of LiH and Li reaches a point in the range of about 1:1 and 2:1. This second phase produces hydrogen gas and allows the hydrogen generator to operate at high pressure. The heat of reaction for this case is only 4687 BTU/lb water reacted (at 2000° F.), which is only about half the heat of the first reaction. Finally, for most early testing of the concept of the invention, the fuel was heated to starting temperature by the electric band and strip heaters suitably clamped to the main body section of the pressure vessel. Since practical use of the hydrogen generator in an underwater closed cycle thermal propulsion powerplant, requires a relatively fast and autonomous quick-start procedure, emphasis was placed on development of a reliable quick-start method as prototype testing progressed. Furthermore, the quick-start technique had to be in compliance with safe handling procedures mainly during final preparation for operation of the hydrogen generator including the welding of the top lid section to the main body section. The quick-start technique of the invention relies on the combustion of a small amount of the Alclo brand (aluminun powder and $KClO_4$) material to create a "hot spot" in each of a plurality of fuel core holes, that is, upstanding tubular bores formed in the fuel when solidified, and then the simultaneous introduction of $SF_6$ gas and liquid into that core hole. The heat generated from the energetic $LiSF_6$ reaction (about 20,000 BTU/lb Li) plus the stirring action of the two-phase (gas and liquid) $SF_6$ injection, gradually brings the bulk of the fuel up to the desired starting temperature with minimal splashing.

A primary object of the present invention, then, is to provide a system for the production of hydrogen gas which is, compact, clean, efficient, controllable, and economical.

Another object of the present invention is to provide such a system which generates hydrogen from a charge of fuel selected from a group consisting of lithium, and alloys of lithium and aluminum, and alloys of lithium and aluminum and lithium hydride, and alloys of lithium and lithium hydride.

Another object of the present invention is the provision of such a system which can be utilized in a number of applications, in one instance as a component for a Rankine cycle engine and, in another instance, as a component in a hydrogen oxygen fuel cell system.

Yet a further object of the invention is to provide such a system in which a maximum output of energy is achieved from a given volume of fuel.

Still another object of the invention is to provide such a hydrogen generating system for which, at least in some instances, suitable cooling water tubing is installed so as to be completely inside a heavy-duty pressure vessel which is sized to withstand anticipated pressure and temperature conditions, typically, up to about 550 psia and 2000° F.

Yet another object of the invention is to provide such a hydrogen generating system which is operable in two phases, the first phase being a LiH formation stage where LiH accumulates as an intermediate reaction product in the fuel bath, producing relatively high heat of reaction per water injected causing LiH to accumulate in the bath along with unreacted Li, Al, and their metal oxides, the second phase producing hydrogen gas and allowing the hydrogen generator to operate at high pressure, the heat of reaction being only about half the heat of the first reaction.

Still a further object of the invention is to provide such a hydrogen generating system in which the fuel is heated to starting temperature at a moderate rate by electric band and strip heaters suitably clamped to the main body section of the pressure vessel.

Yet a further object of the invention is to provide such a hydrogen generating system in which the fuel is heated to starting temperature using a quick-start technique of the invention which relies on the combustion of a small amount of Alclo brand (aluminum powder and $KClO_4$ material) to create a "hot spot" in each of a plurality of fuel core holes, that is, upstanding tubular bores formed in the fuel when solidified, and then the simultaneous introduction of $SF_6$ gas and liquid into that core hole such that the heat generated from the energetic Li-$SF_6$ reaction plus the stirring action of the two-phase (gas and liquid) $SF_6$ injection, gradually brings the bulk of the fuel up to the desired starting temperature with minimal splashing.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

BRIEF DESCRIPTION OF THE DRAWINGS

FIG. 1 is a side elevation view illustrating a reaction vessel embodying the present invention;

FIG. 2 is a cross section view, in elevation, taken generally along line 2—2 in FIG. 1;

FIG. 3 is a detail cross section view of a pyrotechnic arrangement for heating fuel in the reaction vessel of FIGS. 1 and 2;

FIG. 4 is a detail cross section view to provide more detail of a component illustrated in FIG. 2;

DETAILED DESCRIPTION OF THE PREFERRED EMBODIMENT

Figure 5:
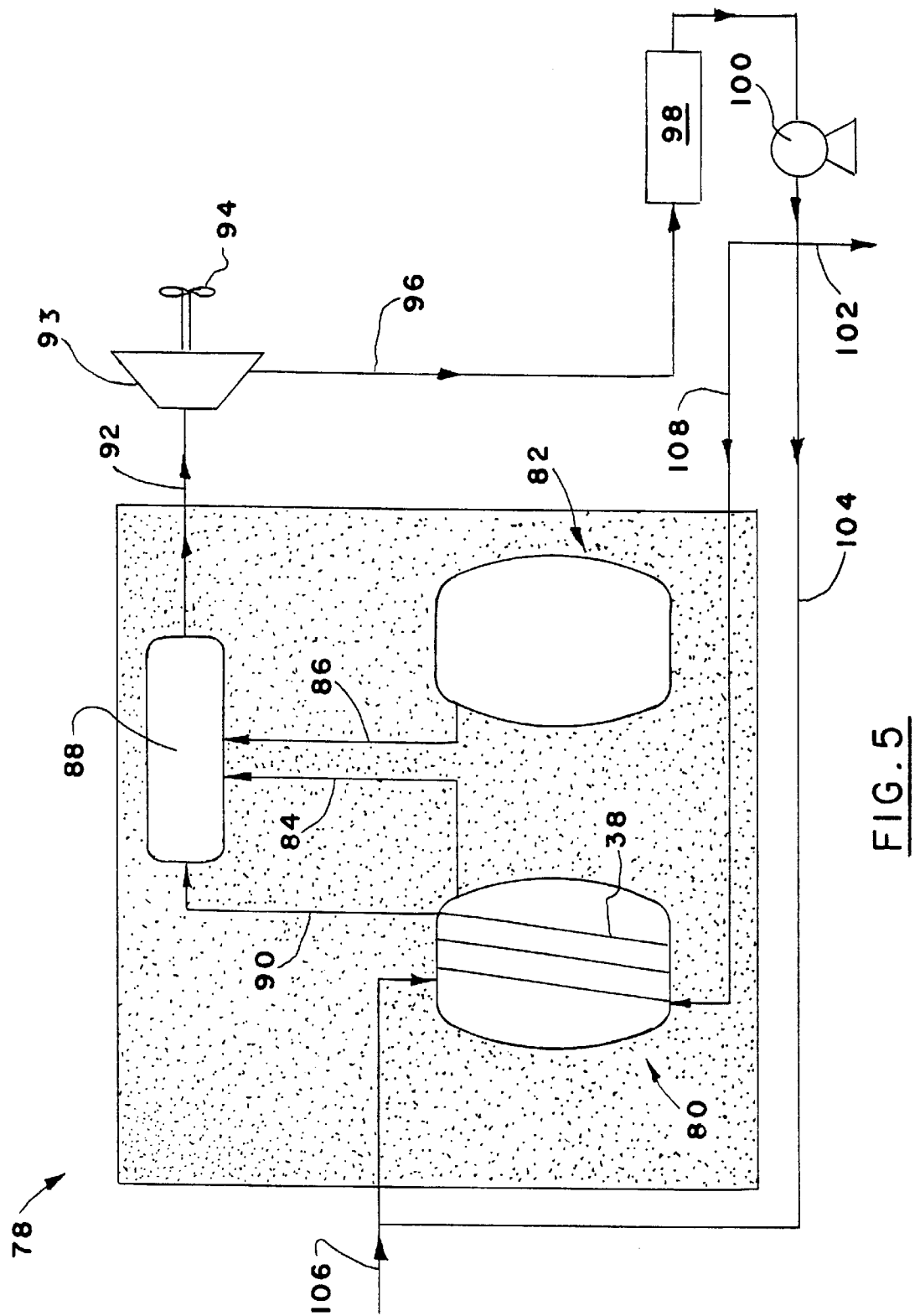
FIG. 5 is a schematic representation of a Rankine cycle engine utilizing the hydrogen generating reaction vessel of FIGS. 1 and 2.

Turn now to FIGS. 1 and 2 which illustrate a reaction vessel 20 which can be utilized to generate hydrogen gas according to the present invention. The reaction vessel 20 is composed of a material which is relatively inert, that is, would not take part in any reactions necessary for the generation of hydrogen gas. Appropriate materials include various stainless steels and other metallic superalloys. In any event, the reaction vessel 20 comprises a base container 22 which is for the purpose of supporting the reactant materials and a lid 24 which matingly connects with the base container to sealingly enclose the reaction vessel. The base container 22 and lid, 24 are preferably generally cylindrical. The former has an integral annular flange 26 adjacent its uppermost rim 28 and the lid 24 has an integral annular flange 30 adjacent its lowermost rim 32. The flanges 26, 30 are matingly engageable and can be locked together by a plurality of circumferentially spaced fasteners 34.

Fluid tight integrity between the flanges 26, 30 is achieved by reason of a circumferentially extending O-ring seal 36 interposed between the flanges.

The reaction vessel 20 thus described is, indeed, a pressure vessel defining a single chamber capable of safely containing reactions which develop operating pressures in excess of 100 psia.

Cooling plumbing is provided in the form of spiral tubing 38 which envelopes the peripheral external surface 40 of the base container 22. It is preferably welded into place and enables flow of cooling water at a rapid rate from an ambient source from the uppermost regions of the base container to its lowermost regions.

The reaction vessel 20 also has provision for heating its interior. This may be achieved in a number of different ways. For example, a propane burner (not shown) may be positioned beneath the base container 22 and ignited when appropriate. In another instance, electrical band heaters 42, 44 may be utilized. In this instance, a plurality of cylindrical band heaters 42 may be suitably mounted on the peripheral exterior of the base container 22 at its lowermost regions. Similarly, strip heaters 44 are suitably mounted to a bottom wall 46 of the base container 22.

Yet another manner of heating, as generally illustrated in FIG. 3 may be employed either by itself or in conjunction with one of the heating techniques just described. In this instance, solid fuel 48, typically in block form, placed in the base container 22, is provided with its own pyrotechnic devices which provide considerable amounts of heat in a nearly instantaneous manner. In this instance, a plurality of core holes 50 are formed into the block of the fuel 48. A plurality of Alclo brand (a mixture of aluminum and potassium perchlorate) pellets 52 are inserted into each core hole 50. The pellets are spaced apart and supported in a bed or matrix 54 of thermite, also known as a mixture of aluminum and copper oxide.

An igniter wire 56 extends from a region beyond the fuel block 48 and, indeed, extends through the interface between the lid 24 and the base container 22 to a location outside of reaction vessel 20. An innermost end of the igniter wire 56 is preferably positioned between a pair of the pellets 52 within the bed 54 of thermite. A vent groove 58 may be provided at an uppermost surface 60 of the fuel block 48 in order to vent the combustion products of the pyrotechnic charge just described.

The block of fuel 48, for purposes of the invention, is selected from the group consisting of lithium, and alloys of lithium and aluminum, and alloys of lithium and aluminum and lithium hydride, and alloys of lithium and lithium hydride. In each instance, a wide range of compositions of the components of the fuel may be utilized when other than 100% lithium. The lithium and lithium-alloy fuel mixtures provide exceptional energy density in terms of hydrogen and heat production. The exact composition of the alloy fuel is determined according to the hydrogen and heat generation requirements of the Rankine or hydrogen oxygen fuel cell systems.

Prior to operation of the reaction vessel 20, it may be desirable to purge the interior of the vessel, after it is sealed, with an inert gas for the purpose of removing oxygen which, if present, would have an undesirable effect on the reaction. For this purpose, a line 62 is illustrated in FIGS. 1 and 2 connected via a fitting 64 to the lid 24 for introducing a pressurized inert gas such as argon to the interior of the reaction vessel 20. Flow of the inert gas is not continuous. When water injection into the vessel is begun, flow of the inert gas is terminated.

While purging continues, the heating operation begins using any, or any combination, of the heating mechanisms already described, or any other manner of heating which may be suitable for the purpose. Heating continues until the fuel is molten which occurs at approximately 600° F. At this point, reactant consisting of water is introduced into the vessel via a nozzle 66 directed at a surface 68 of the now molten fuel 48A as illustrated in FIG. 2.

Indeed, the nozzle 66 is so directed at the surface of the molten fuel 48A that the water spray penetrates the surface and causes agitation of the mass of the molten fuel. The reaction of water and fuel results in the production of hydrogen gas and heat. Because the reaction between the fuel and the reactant, or water, is an exothermic one, once the reaction has begun, it is no longer necessary to continue with the operation of the heaters 42, 44 and their operation is then discontinued. Heat is withdrawn from the reaction vessel 20 by means of water flow through the spiral tubing 38, and exhaust tubing 70 is employed for withdrawing the hydrogen gas from the interior of the reaction vessel 20.

Because of the intense heat within the reaction vessel, as well as the violent agitation caused by the reaction, a protective cylindrical shield 72, preferably made of stainless steel, surrounds a water inlet conduit 74 and the nozzle 66 to prevent their degradation.

Since the reaction within the vessel 20 is vigorous and combustion-like, the hydrogen gas so produced leaves the vessel via the exhaust tubing 70 at a very high velocity. This causes entrainment of unreacted fuel and solid products, for example, oxides and hydroxides of lithium and aluminum (in the event aluminum is in the starting fuel) in the gas stream which must be removed before it leaves the vessel. For this reason, it is important to provide a filter 76 which is integral with the cylindrical shield 72 and is interposed between the interior of the vessel and the exhaust tubing 70. The hydrogen gas which exits the reaction vessel 20 is thereby assured of having a high level of purity.

The reaction vessel 20 for generating hydrogen can be employed in a variety of systems. In one instance, for example, it may have application in a Rankine steam cycle power plant 78 used for underwater propulsion purposes. Such a system is illustrated in FIG. 5. It comprises a hydrogen generator 80 generally of the construction of the reaction vessel 20 and an oxygen generator 82 which may be, for example, generally of the construction disclosed in commonly assigned copending application Ser. No. 08/132, 021 and filed Oct. 5, 1993, now U.S. Pat. No. 5,376,352. As indicated in FIG. 5, hydrogen gas from the hydrogen generator 80 and oxygen gas from the oxygen generator 82 flow via lines 84, 86, respectively, to a burner 88, along with low temperature steam which travels via a line 90 from the spiral tubing 38 in the burner 88. The hydrogen gas and the oxygen gas are combusted to generate super heated steam which travels via line 92 to a turbine 93 which produces power, for example, to drive a shaft and propeller 94. Exhaust lower energy steam is directed from the turbine 93 via line 96 to a condenser 98 which operates to change its state into water. A feed water pump 100 operates to cycle the water through the power plant. Excess water from the feed water pump may be dumped via a line 102 while reactant water may be delivered to the hydrogen generator 80 via a line 104 along with starting water from a line 106, and cooling water may be delivered to the spiral tubing 38 via a line 108.

Figure 6:
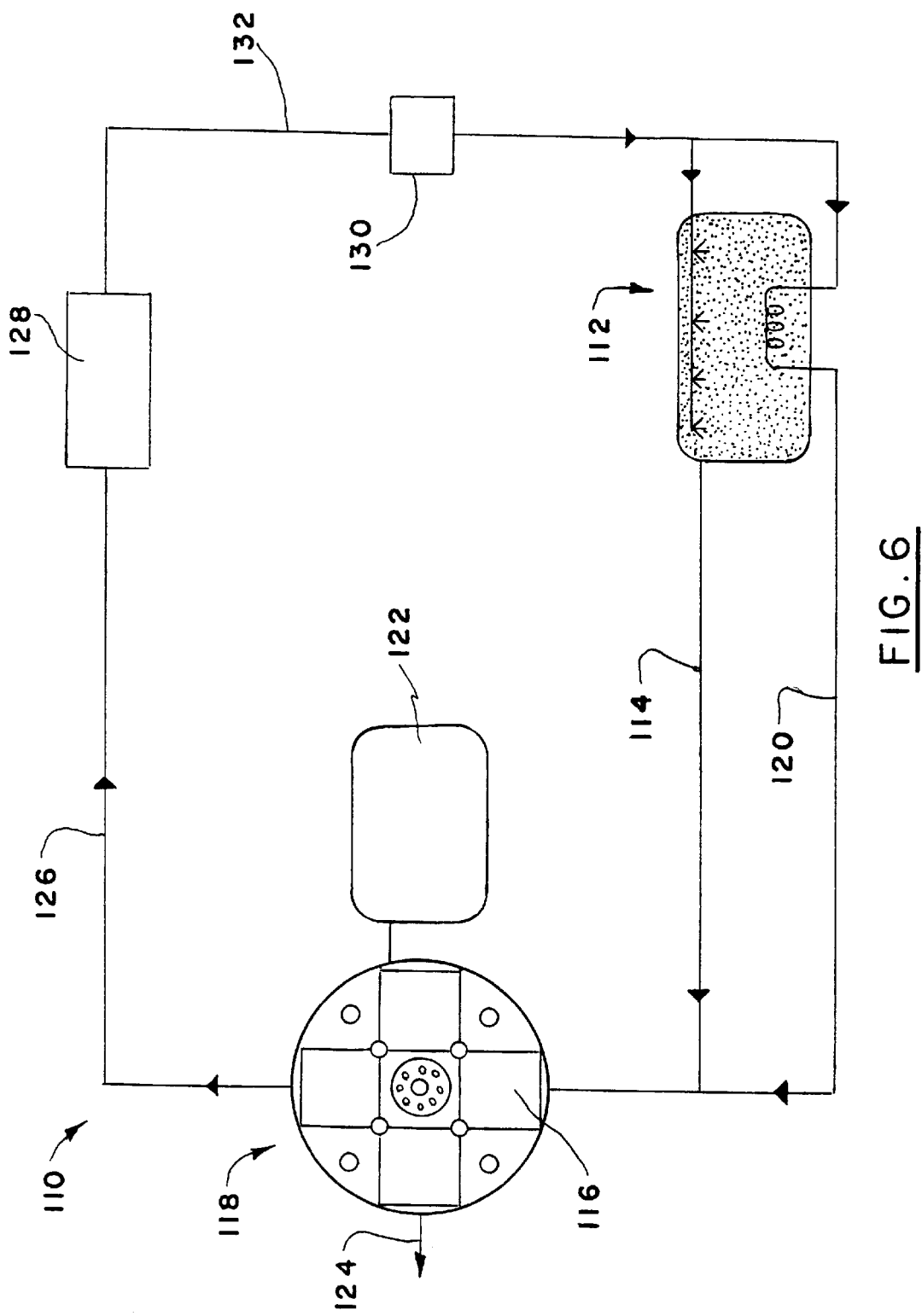
FIG. 6 is a schematic representation of a hydrogen oxygen fuel cell system utilizing the hydrogen generating reaction vessel of FIGS. 1 and 2 and FIG. 7 is a side elevation view illustrating the exterior of a modified reaction vessel embodying the present invention.
Figure 7:
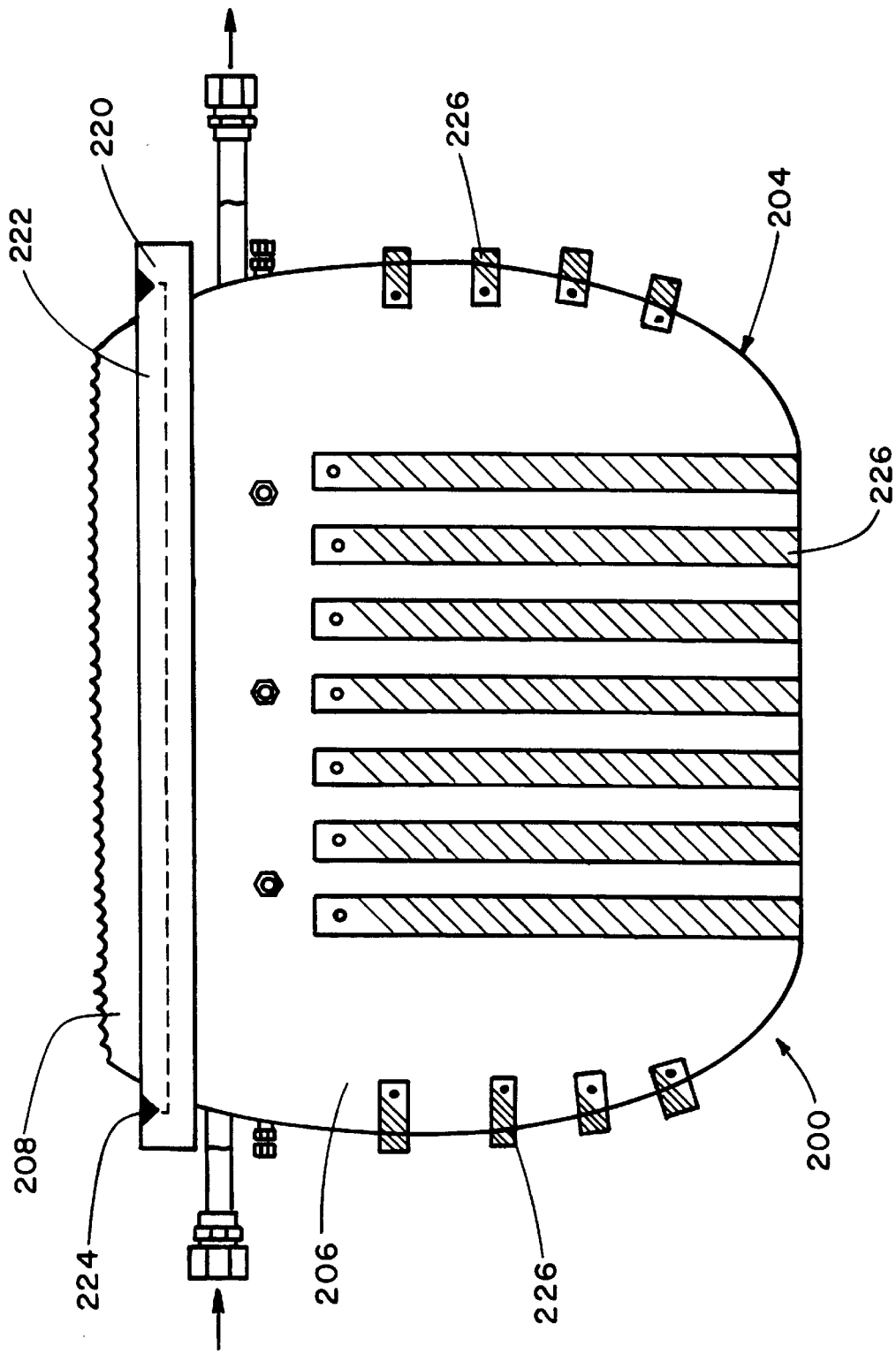

In another instance, as illustrated in FIG. 6, a hydrogen oxygen fuel cell system 110 may utilize a hydrogen generator 112 which is substantially of the construction of the reaction vessel 20. In this instance, hydrogen gas generated within the generator 112 is delivered via a line 114 to a plurality of stacks 116 within a solid oxide fuel cell 118. Water heated by the hydrogen generator 112 may also be delivered to the stacks 116 via a line 120 to wet the solid oxide electrodes to maintain ionic conductivity. The steam produced in the hydrogen generator is delivered to the fuel cell stacks where it wets the solid oxide electrodes to maintain ionic conductivity. An oxygen generator 122, which may be similar to the oxygen generator 82 and of the type disclosed in U.S. Pat. No. 5,376,352, mentioned above, serves to provide oxygen gas to the fuel cell 118. The fuel cell 118 is operable to generate electricity and to deliver it externally as schematically represented by an arrow 124. Water produced as a result of the electrochemical reaction of the hydrogen gas and oxygen gas is withdrawn from the fuel cell 118 and delivered via a line 126 to a heat exchanger 128 which reduces the temperature of the water to an ambient level. A feed water pump 130 in a line 132 is operable for cycling the water through the fuel cell system 110.

A further improved hydrogen generator 200 is illustrated in FIGS. 7–13 and represents the latest and largest of a series of reactors developed to chemically supply hydrogen gas and heat. One typical application of the generator 200 is as a component of an underwater closed cycle thermal propulsion powerplant and its design, function and test performance will be described in the following section as a means of detailing the latest technology and issues regarding chemical hydrogen generation.

While still a batch-type reactor, the design of the improved hydrogen generator 200 is slightly different than prior pilot-scale vessels in that the boiler cooling water tubing was no longer part of the actual vessel structure in all instances as earlier described. Instead, at least in some instances, suitable cooling water tubing 202 is installed so as to be completely inside a heavy-duty pressure vessel 204, which is sized to withstand anticipated pressure and temperature conditions, typically up to about 550 psia and 2000° F.

The general operating and design requirements of the improved system include the following considerations:

Supply a controllable flow of clean hydrogen gas, produced from the reaction of molten alloy fuel with water;

Provide a means of removing reaction heat and generating steam;

Provide storage and containment of the alloy fuel and reaction products;

Operate at pressures up to 550 psia and temperatures up to 2000° F.;

Provide a means of "quick starting" the reactor, that is, initially bringing the fuel up to reaction (molten) temperature in a short period of time; and Mount and operate inside the condenser shell section of the test vehicle for the underwater closed cycle thermal propulsion powerplant.

The pressure vessel 204 constructed for this application includes two primary sections. Viewing FIG. 8, a larger main body section 206 accommodates the zone in which the reaction is to take place, the cooling water tubing 202, and the entire storage volume of the fuel 48, 48A. A smaller top lid section 208 contains an internal filter 210, mounts 212 for water injectors 214, fittings 216 for instrumentation connections, and a hydrogen outlet 218. The main body and top lid sections 206, 208 both contain flanges 220, 222, respectively, that are welded together, as indicated at 224, during the final assembly to seal the pressure vessel or reactor 204.

Some of the general specifications of the resulting improved hydrogen generator 200 are listed below; they are not intended to be restrictive of the invention but are related only for purposes of describing one system which operates according to the invention:

Overall shape and size: Cylinder with torispherical end caps; 20" diameter by 23" long Internal Coil: 100' of ¾ "OD×0.065" wall tubing Void volume of Main Body: 2.42 ft³

Total Weight (without fuel): 425 pounds

Typical Fuel Weight: 55–75 pounds

For earlier prototype testing of the hydrogen generator 200, electric band and strip heaters 226 (FIG. 7) were clamped on the outside of the main body section 206 shell to heat the fuel to a starting temperature of about 600° F. Typically 15 heaters are mounted around the main body section to provide approximately 13,000 watts of heater power. The heaters 226 are also used to heat the pressure vessel or reactor during fuel preparation, that is, when the fuel is initially introduced into the main body section of the pressure vessel. More recently, however, the heating process has been initiated using a chemical combustion quick-start procedure which will be described below.

The improved hydrogen generator 200 not only includes the pressure vessel 2054 itself, but also important support systems outside the pressure vessel. These systems, presented in FIGS. 11, 12, and 13 include supply loops for both reaction and cooling water, components for hydrogen flow measurement and product separation, and all the instrumentation used to monitor and control operation. The design and hardware of these systems may vary slightly between uses, but typical schematic diagrams of an injector water flow loop 230 cooling water loop 232, and hydrogen flow plumbing 234 are outlined in FIGS. 11, 12 and 13, respectively.

The general chemistry for the case of the lithium-water reaction at 2000° F. is typically expressed by the relationship:

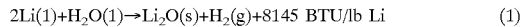

$$2Li(1)+H_2O(1) \rightarrow Li_2O(s)+H_2(g)+8145 \text{ BTU/lb Li} \qquad (1)$$

while that of an alloy fuel containing 92 mole percent lithium and 8 mole percent aluminum is expressed by the relationship:

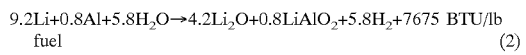

$$9.2Li+0.8Al+5.8H_2O \rightarrow 4.2Li_2O+0.8LiAlO_2+5.8H_2+7675 \text{ BTU/lb fuel} \qquad (2)$$

Equations (1) and (2) represent the overall or final reaction chemistry. As will be explained below, intermediate reactions and other products will form because of the bath-type reaction process, that is, as water is introduced into an excess of fuel.

Both equilibrium modeling and experimental performance of the reaction process have revealed another difficulty associated with application of pure lithium or aluminum-lithium fuels. Reaction chemistry, and thus hydrogen generation, are dependent on reactor operating pressure, at least during the initial part of the process. This pressure effect does not initially allow the reactor to operate at elevated pressure, which precludes an immediate supply of hydrogen. In one typical application of the hydrogen generator of the invention, for example, in an underwater closed cycle thermal propulsion powerplant, it is essential for the hydrogen generator to operate at elevated pressure (up to about 550 psia), because of the high downstream operating pressures (about 550 psia) of the $H_2$—$O_2$ combustor 88 and turbine 93, for example.

The inability of the reactor to pressurize initially is due to the formation of LiH in the fuel bath instead of free hydrogen. The inventors have come to realize, however, that this represents a transient situation as the fuel bath eventually becomes saturated with LiH, given adequate water addition. When LiH saturation occurs, the hydrogen generator pressurizes and provides a controllable amount of hydrogen gas.

As hydrogen generation testing progressed, it became readily apparent that a single straightforward reaction equation (as in equations (1) or (2)) would be insufficient for modeling the actual process over the entire operating period. Testing showed that the reaction of lithium with water produced products of LiH, LiOH, or $Li_2O$ in varying amounts, rather than the common assumption of just $Li_2O$. Additionally, exact product formation depended on pressure, temperature and surrounding reaction environment and concentrations—properties that varied considerably over the reaction period.

This led to the development of a two-part reaction model. The first phase is assumed to be a LiH formation stage where LiH accumulates as an intermediate reaction product in the fuel bath. Assuming the initial fuel concentrations of 92 mole percent lithium and 8 mole percent aluminum, as most recent testing has specified, the resulting stoichiometric reaction equation for the initial reaction period is expressed by the relationship:

$$(9.2)Li+(0.8)Al+(2.9)H_2O \rightarrow (0.8)LiAlO_2+(1.3)Li_2O+(5.8)LiH \quad (3)$$

This reaction produces relatively high heat of reaction per water injected (9171 BTU/lb water reacted at 2000° F.) compared to other possible mechanisms, and thus has the potential to generate high rates of steam.

As this reaction occurs, LiH accumulates in the bath along with unreacted Li, Al, and their metal oxides. Equilibrium modeling predicts that the bath will reach a LiH saturation condition when the molar ratio of LiH and Li reaches a point in the range of about 1:1 and 2:1. At this point, reaction chemistry will transition to the second reaction expressed by the following relationship:

$$(9.2)Li+(0.8)Al+(13.8)LiH+(12.7)H_2O \rightarrow (0.8)LiAlO_2+(11.1)Li_2O+(19.6)H_2 \quad (4)$$

This second phase produces hydrogen gas and allows the hydrogen generator 200 to operate at high pressure. The heat of reaction for this case is only 4687 BTU/lb water reacted (at 2000° F.), which is only about half the heat of the first reaction.

Both reaction equations (3) and (4) assume that the product $LiAlO_2$ forms rather than $Li_5AlO_4$ primarily because thermochemical data is not available for $Li_5AlO_4$. However, the model assumes that $Li_5AlO_4$ is the equivalent of combining $LiAlO_2$ and $Li_2O$ as in the relationship:

$$Li_5AlO_4 \leftarrow \rightarrow LiAlO_2 + 2Li_2O \quad (5)$$

In effect, thermochemical predictions are considered to be the same regardless of which lithium-aluminum oxide is defined.

Once the rates of steam and hydrogen generation are specified, the above expressions, in combination with the heat of reaction, are used to determine the rate of water injection and the time duration of reaction periods for a given test.

While equations (3) and (4) are believed to accurately represent the reactions by themselves, a number of "ideal system" assumptions are required when applying them to the defined hydrogen generation process. These assumptions relate to mass and heat transfer characteristics of the system and generally require: (1) a well-mixed fuel bath, (2) fast reaction kinetics, (3) isothermal operation (about 2000° F.), and (4) low overall resistance to mass and heat transfer in the reaction system.

Experiments have shown that the model is most useful in providing an ideal prediction of important operating parameters. Most notably, properties such as steam generation during the initial reaction period, the point of reaction transition, and hydrogen generation during the beginning of the second period, have been accurately modeled in tests.

Equations (3) and (4) may be rewritten to cover a broad range of operating conditions as follows so long as operations, during the second phase, are performed at elevated pressures in excess of about 100 psia, as follows:

$$(x)Li+Al+(x+3)/4.H_2O \rightarrow LiAlO_2+(x-5)/4.Li_2O+(x+3)/2.LiH \quad (6)$$

and $$(x)Li+Al+(y)LiH+(x+y+3)/2.H_2O \rightarrow LiAlO_2+(x+y-1)/2.Li_2O+(x+2y+3)/2.H_2 \quad (7)$$

where x=the stoichiometric coefficient for Li (lithium) normalized by the coefficient for Al (aluminum);

where y=the stoichiometric coefficient for LiH (lithium hydride) normalized by the coefficient for Al (aluminum); and where y (LiH) and x (Li) are in the molar ratio range of about 1:1 to 2:1.

LiH can also be added to the fuel initially to enable immediate hydrogen generation, but this will also lower the heat generating capability of the fuel.

For most early testing of the concept of the invention, the fuel 48 was heated to starting temperature by the electric band and strip heaters 226 suitably clamped to the main body section 206 of the pressure vessel 204. Practical use of the hydrogen generator 200 in an underwater closed cycle thermal propulsion powerplant, however, required a relatively fast and autonomous quick-start procedure. Consequently, emphasis was placed on development of a reliable quick-start method as prototype testing progressed. Additionally, the quick-start scheme had to be in compliance with safe handling procedures mainly during final preparation for operation of the hydrogen generator 200, including the welding of the top lid section 208 to the main body section 206.

The initial approach in the development of the quick-start technique as applied to the hydrogen generator 200 was to implement technology similar to that used in boilers for a so-called SCEPS system (stored chemical energy propulsion system). The rapid heating of SCEPS boilers is typically accomplished using a commercially available pyrotechnic comprised of aluminum and potassium perchlorate ($KClO_4$). One such pyrotechnic composition is available under the trademark Alclo, previously noted, and is manufactured by Tracor Aerospace, Inc. of East Camden, Ariz. In pellet form, it is recognized by part number 6205079. Its composition is 35% aluminum powder, 62% potassium perchlorate ($KClO_4$), and 3% suitable binder material. The Alclo brand pyrotechnic composition has a very high energy density, but a significant quantity is still required to heat fuel to reasonable starting temperatures. For example, in the SCEPS system, about 0.25 lb Alclo/lb lithium is required to heat lithium fuel to 1000° F. In addition, the burn rate cannot be controlled inasmuch as the complete charge burns very rapidly once ignited. This effectively heats SCEPS boilers to operating temperature within a second or two.

Initial quick-start tests in the hydrogen generator using the Alclo brand composition identified some serious drawbacks in regard to its heating/combustion characteristics for this particular application. These drawbacks primarily involved the explosive power of the combustion reaction itself, and the resulting inability to contain fuel and heat within the main body section 206 of the pressure vessel 204. In addition, some of the interior hardware items such as injectors, filters, and instrumentation fittings were easily damaged as the result of burning the Alclo brand composition and splashed fuel. Another concern regarding the Alclo brand composition was its potential to ignite during final welding procedures, for example, TIG (Tungsten Inert Gas) welding or MIG (Metal Inert Gas) welding of the top lid section and the main body section. While some progress was made in containing the force of a pure Alclo brand combustion quick-start procedure, an alternative heating method was adopted, which significantly reduced the amount of Alclo composition required and greatly simplified initial fuel preparation.

Figure 8:
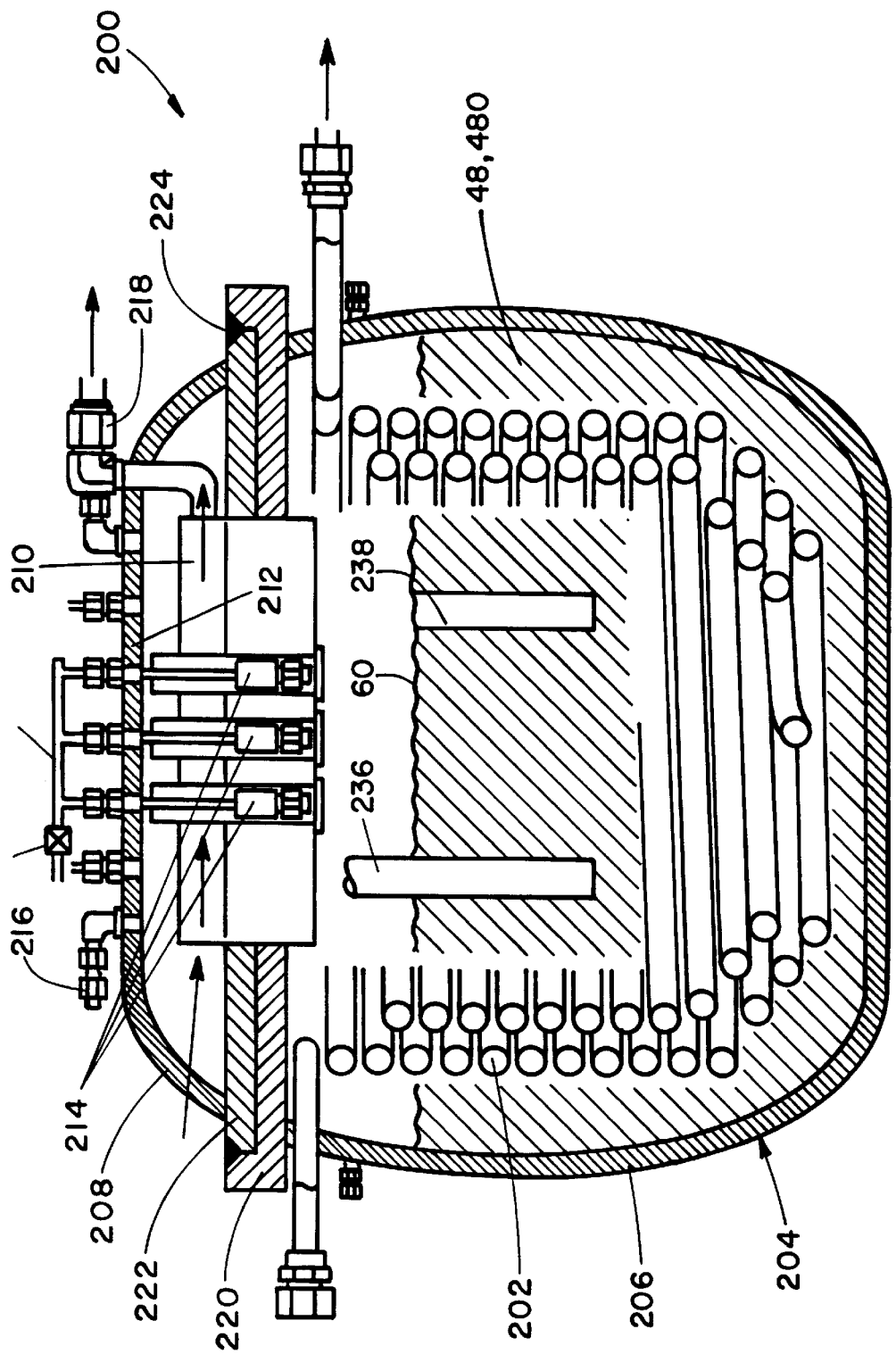
FIG. 8 is a cross section view, in elevation, of the modified reaction vessel illustrated in FIG. 7.
Figure 9:
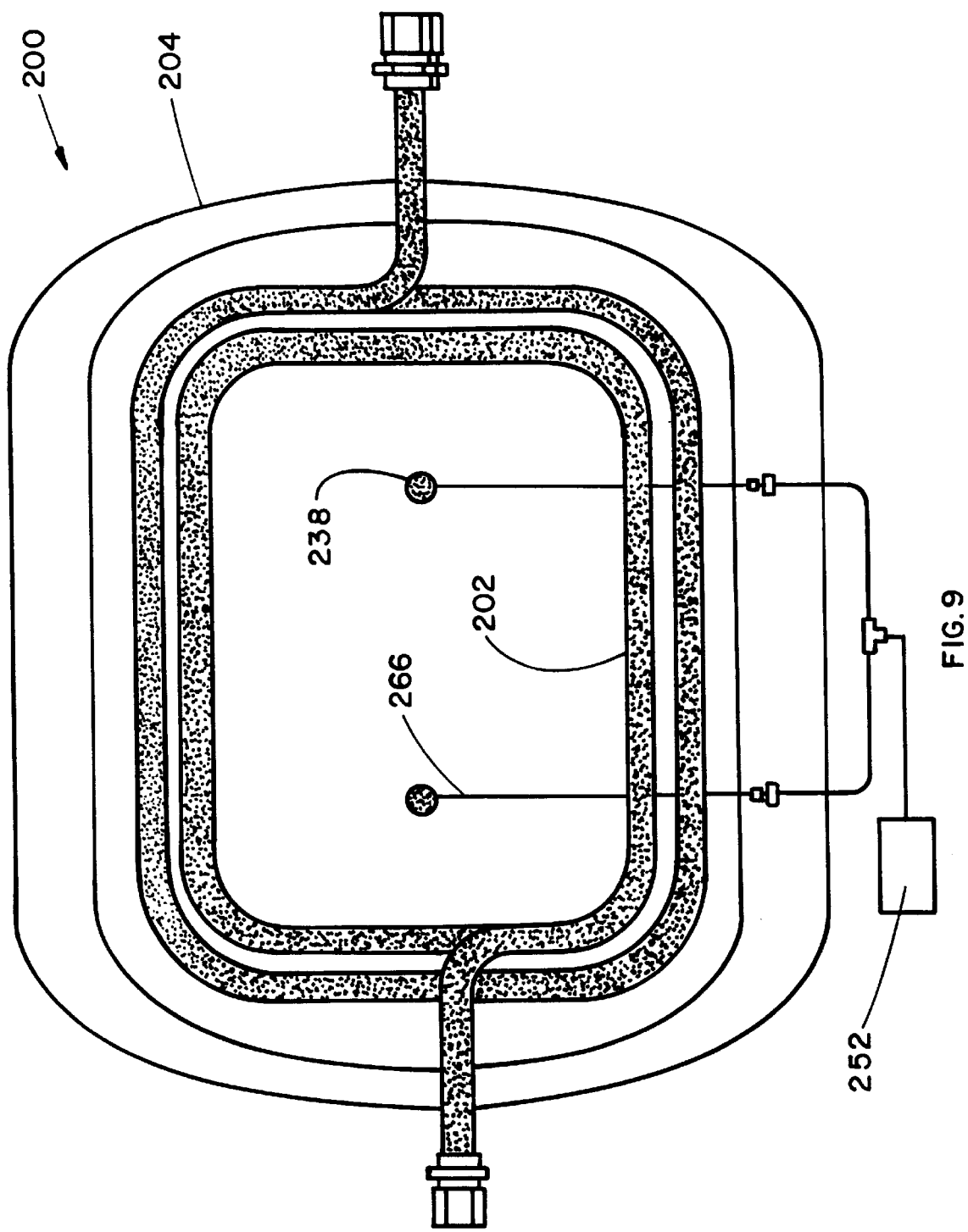
FIG. 9 is a top plan view of the main body section of the modified reaction vessel generally as illustrated in FIG. 8.
Figure 10:
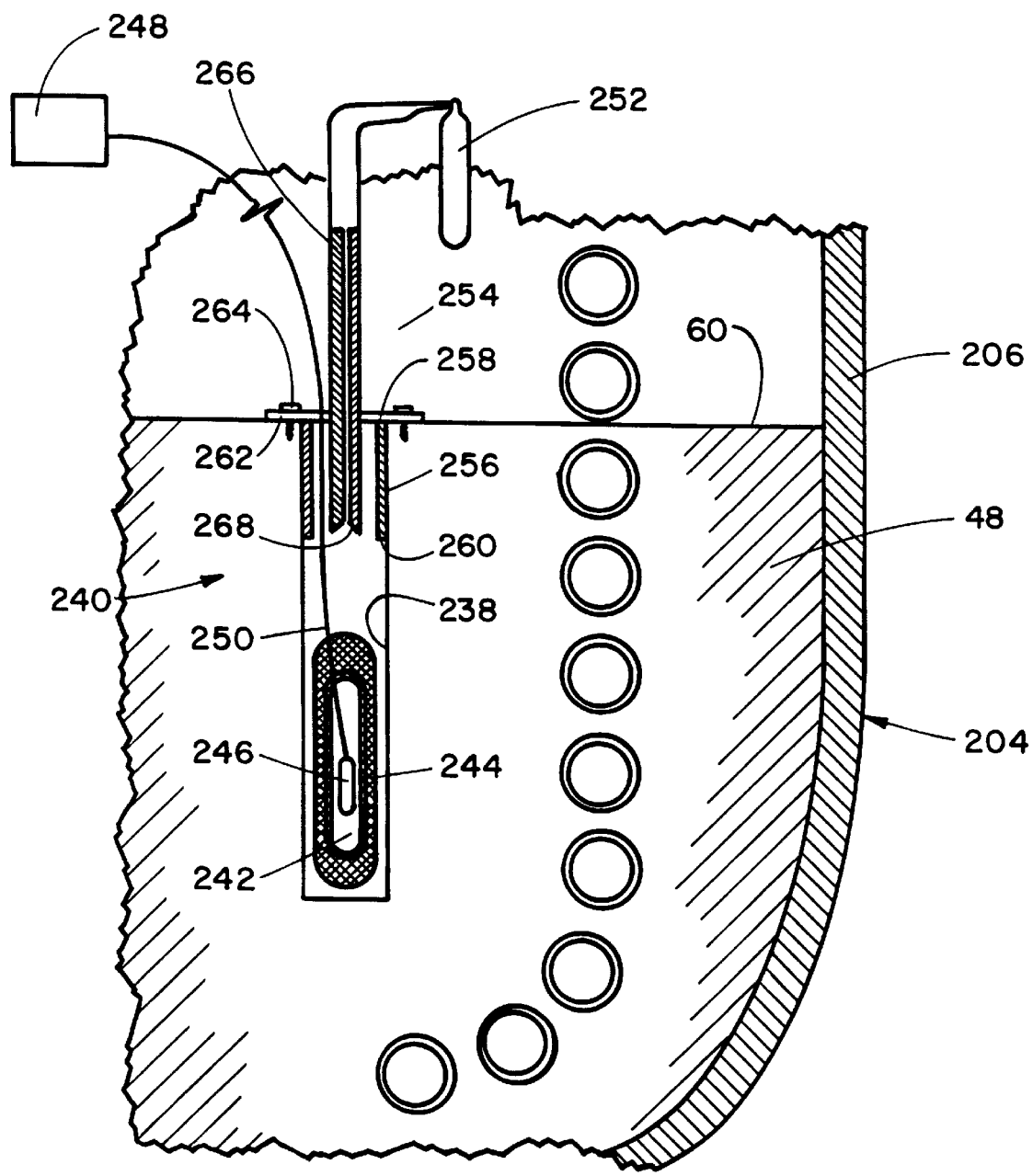
FIG. 10 is a detail cross section view, in elevation, of a portion of the modified reaction vessel generally as illustrated in FIG. 8 to illustrate components required for the quick-start technique of the invention.
Figure 11:
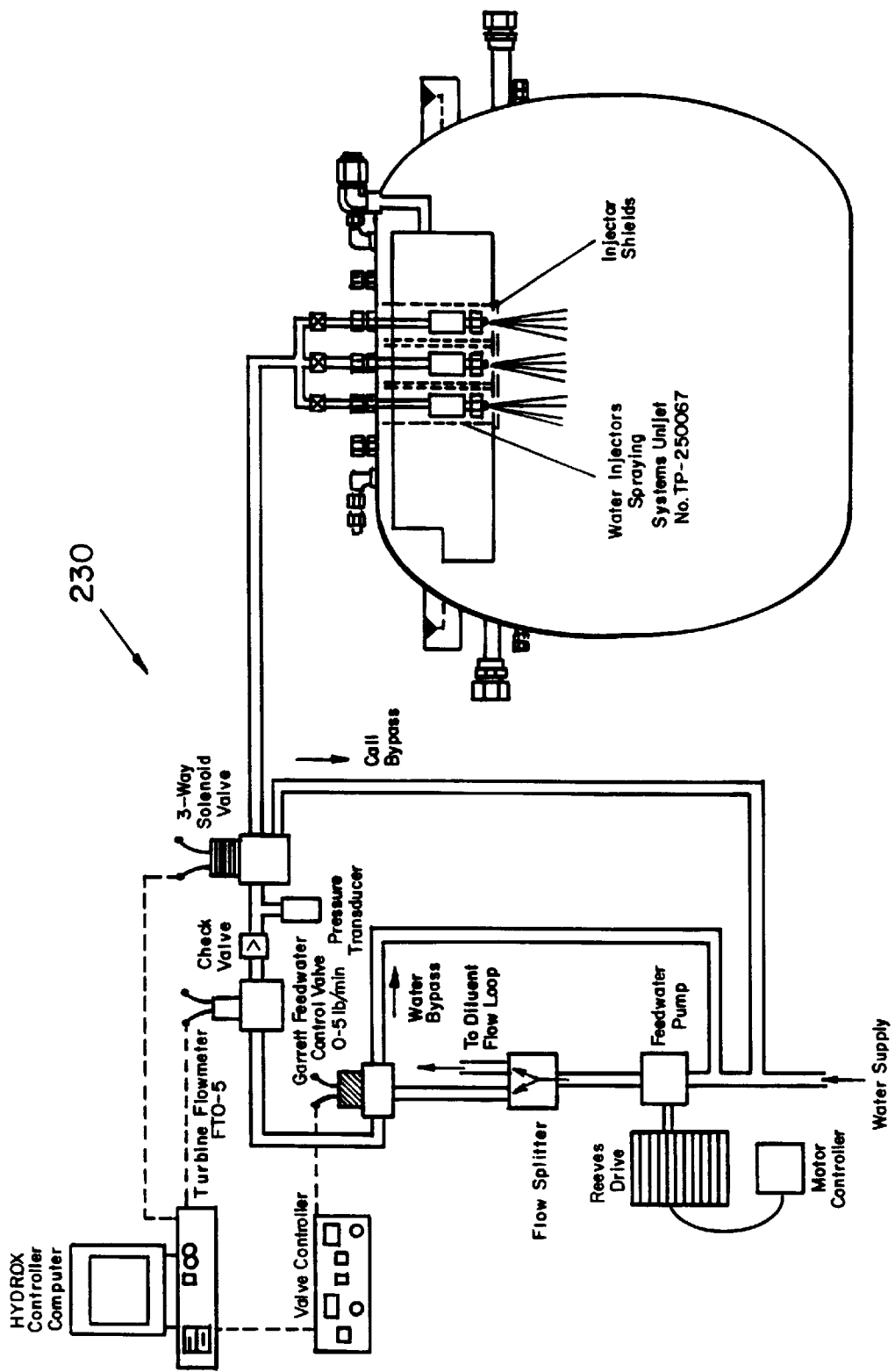
FIG. 11 is a schematic diagram illustrating the pressure vessel of FIGS. 7 and 8 and a typical injector water flow network employed in combination therewith.
Figure 12:
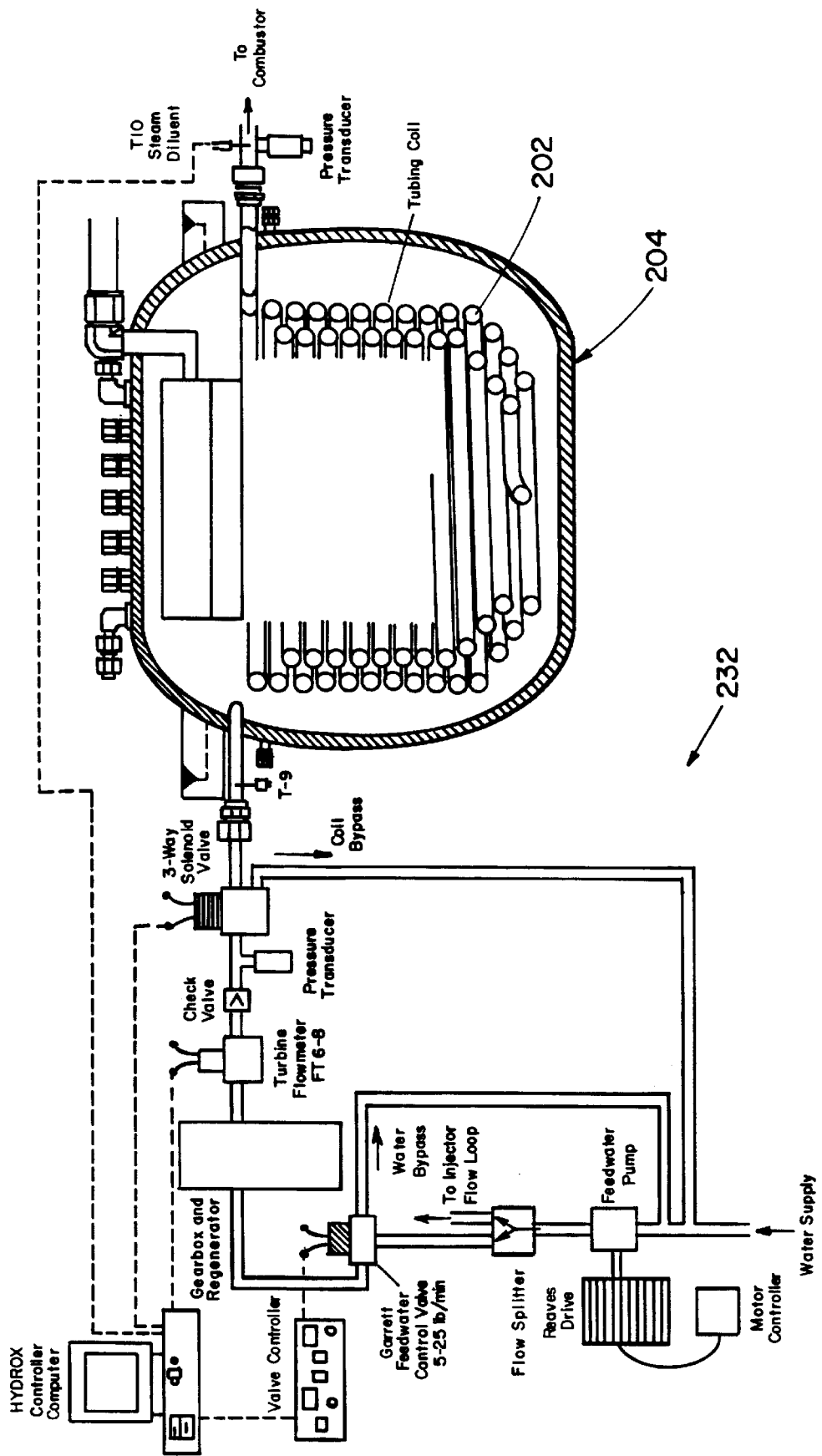
FIG. 12 is a schematic diagram illustrating the pressure vessel of FIGS. 7 and 8 and a typical cooling water flow network employed in combination therewith.
Figure 13:
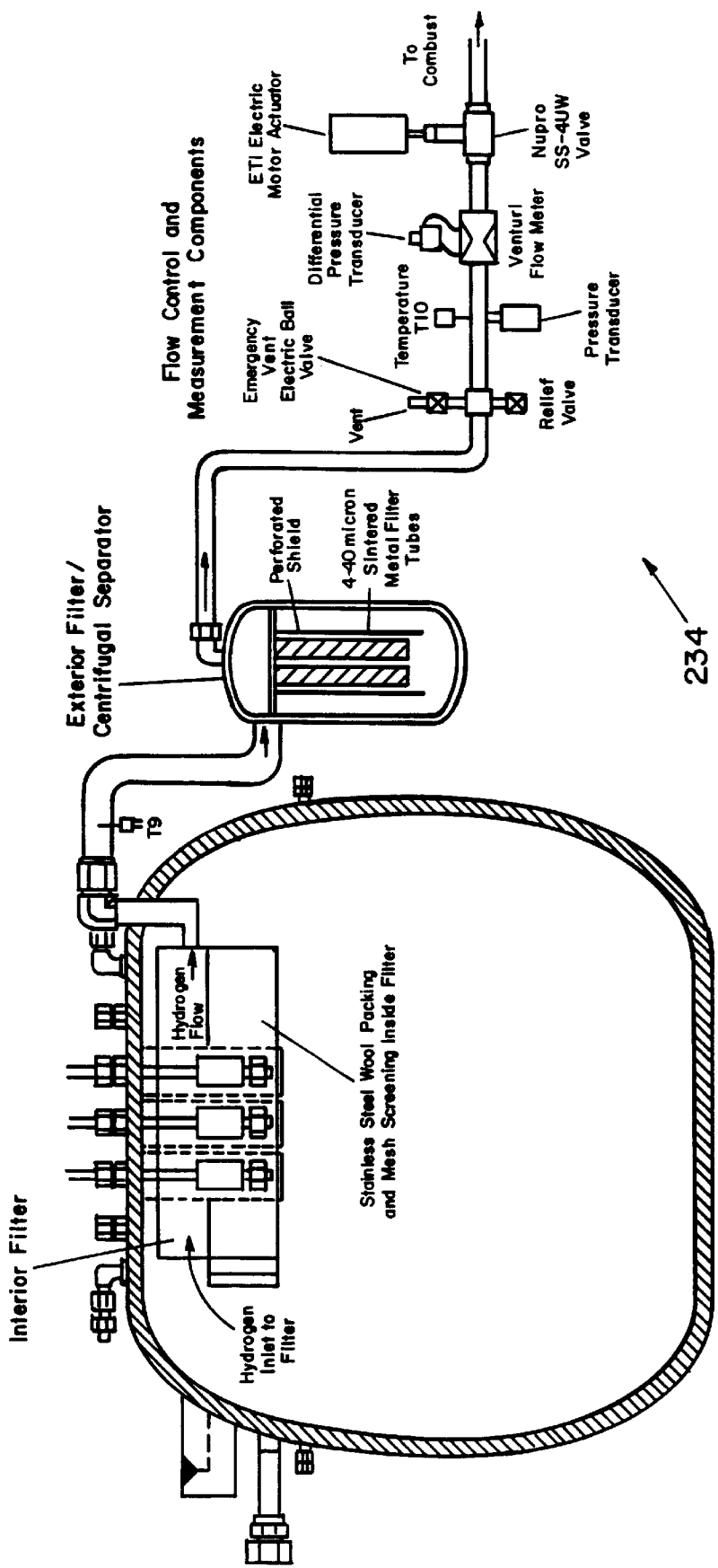
FIG. 13 is a schematic diagram illustrating the pressure vessel of FIGS. 7 and 8 and a typical hydrogen flow network employed in combination therewith, including components for filtration, separation, flow control, and flow measurement.

Turn now to FIGS. 8, 9, and 10 for a description of the preparation for and operation of the quick-start procedure for initiating operation of the hydrogen generator 200. With the main body section 206 covered, either with the top lid section 208 or in some other manner, but not sealed, molten lithium (at about 500° F.) is poured into the main body section. Simultaneously, argon or other suitable inert gas is pumped into the pressure vessel 204 in the manner previously described so as to maintain an inert atmosphere in the pressure vessel. A typical charge of lithium is about 50 pounds although that amount is exemplary and not intended to restrict the invention. The lithium is then allowed to cool to room temperature and solidify and the pressure vessel 204 is sealed under the argon atmosphere. Thereafter, using the heaters 226, the pressure vessel 204 is heated and the temperature of the lithium is raised to between about 500° F. and 600° F. A mixing head (not shown) is lowered into the molten lithium and stirring begun. Slowly, solid aluminum pellets (approximately −7+40 mesh, of tear drop shape) are added. Of the total amount of alloy fuel prepared, the aluminum concentration is about 25% to about 45% by weight. Stirring of the alloy mixture is continued even as it is heated to 900° F. for a period of one to two hours.

Thereafter, ¾" diameter upright stainless steel rods 236 (only one is illustrated in FIG. 8) are suitably positioned in the molten fuel so as to form at least a pair of upstanding tubular bores 238. The pressure vessel 204 is cooled to room temperature by circulating cool water from the cooling water loop 232 (FIG. 12) through the cooling water tubing 202. When the fuel is solidified, the upright stainless steel rods 236 are removed from the solidified fuel.

The new quick-start method implemented for the hydrogen generator 200 utilizes a pyrotechnic device 240 (FIG. 10) mounted in each upstanding tubular bore 238 for producing a hot spot when ignited. A hot spot is defined, for purposes of the invention, as a molten surface having a temperature in excess of about 500° F. The pyrotechnic device 240 includes a measured amount 242 of aluminum powder and $KClO_4$ wrapped in aluminum foil 244 and surrounded by aluminum mesh screening 246. The measured amount may be one crushed Alclo brand tablet (preferably about 0.75 gr. by weight) but should be in the weight range of about 0.75 gr. to 1.5 gr. An electric match igniter 246 is embedded in the measured amount 242 of the aluminum powder and $KClO_4$. Satisfactory for purposes of the invention is the electric match igniter manufactured by Cartridge Actuated Devices, Inc. of Fairfield, N.J. as part no. 071003-1. The pyrotechnic device 240 further includes an EMF source 248 for energizing the electric match igniter 246 and igniter wire leads 250 extending to the electric match igniter from the EMF source 248.

Also used for the quick-start method is a source 252 of $SF_6$ gas and liquid and an injector mechanism 254 for introducing the $SF_6$ gas and liquid into each tubular bore 238 and onto the hot spot at a critical flow rate to thereby raise the temperature of the entire charge of fuel 48, 48A to the range of about 600° F. to about 1500° F. The injector mechanism 254 includes a sleeve 256 slidably and engageably received in an upper region of the upstanding tubular bore 238 and extending between an upper rim 258 and a lower rim 260. An aluminum cover 262 is attached to the upper rim 258 of the sleeve and suitable fasteners 262 are employed for attaching the aluminum cover to the solid upper surface 60 of the charge of fuel 48 before the heating operation commences. A conduit 266 extends between the source 252 of $SF_6$ gas and liquid and terminates at a nozzle 268 for directing the $SF_6$ gas and liquid onto the hot spot at the critical flow rate, that is, issuing forth at the speed of sound. The conduit 266 is fixed to the cover 262 so that the nozzle 268 is firmly held in position within the upstanding tubular bore 238.

Thus, the quick-start technique of the invention relies on the combustion of a small amount of the Alclo brand material to create a "hot spot" in each of the fuel core holes, that is, in the upstanding tubular bores 238, and then the simultaneous introduction of $SF_6$ gas and liquid into that core hole. The heat generated from the energetic $Li-SF_6$ reaction (about 20,000 BTU/lb Li) plus the stirring action of the two-phase (gas and liquid) $SF_6$ injection, gradually brings the bulk of the fuel 48, 48A up to the desired starting temperature with minimal splashing.

The design and location of the quick-start core holes or upstanding tubular bores 238 are shown in FIGS. 8 and 9. Two bores 238 are illustrated being installed along the centerline of the fuel bath (FIG. 9). These are then loaded with a small amount of pyrotechnic start charge comprised primarily of the electric match igniter 246, one crushed Alclo brand tablet (about 0.75 gr.). The conduit 266 may be, for example, a narrow-bore ¼" stainless steel tube which introduces $SF_6$ flow about 1" below the fuel surface 60 when the start charge is ignited. The $SF_6$ is stored as a liquid at its vapor pressure (300 psia at 60° F.) at the source 252, in a vessel outside the pressure vessel 204, and its flow rate is roughly controlled by the length (and corresponding pressure drop) of the narrow-bore tubing, conduit 266, leading into the bore 238.

Uniform fuel bath temperatures of 1200°–1400° F. have been achieved without internal damage following a $SF_6$ injection period of about 1½ minutes. The total amount of $SF_6$ required for the heating period was determined from energy calculations taking into account the heat of $Li-SF_6$ combustion along with sensible heats and heats of fusion of the fuel. Aluminum was assumed to be an inert material in the calculations. About 4–5% of the original lithium was consumed during quick-start combustion, although this was accounted for in the original fuel charge. To the extent known to the inventors, the additional fuel volume (for the $Li-SF_6$ reaction) is far less than that required by alternate heating methods.

An important advantage of this quick-start design is that it greatly simplifies final reactor assembly procedures. Because of the absence of large quantities of Alclo, the top lid section and flanges 220, 222 are manually TIG welded during final assembly without exposing welding personnel to a dangerous quantity of the Alclo brand composition. In addition, only two core holes or bores 238 were required, and no special hardware or extraordinary techniques are required to contain the fuel 48, 48A. In effect, this quick-start technique eliminates the need for remote welding and other special handling/safety precautions during final test preparations.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A Rankine cycle engine comprising:
   a hydrogen gas generator including:

an enclosed vessel defining a single chamber containing a charge of fuel selected from the group consisting of lithium, and alloys of lithium and aluminum, and alloys of lithium and aluminum and lithium hydride, and alloys of lithium and lithium hydride;

means capable of heating the charge of fuel within said vessel to a temperature at which the fuel is molten without any introduction of water to said vessel;

feedwater pump means for introducing to said vessel for reaction with the charge of fuel a reactant consisting of water resulting in the production of hydrogen gas and heat, said introducing means including a nozzle directed at the surface of the molten fuel with sufficient pressure that the reactant penetrates the surface thereof and causes agitation of the molten mass of fuel; and tubing means for withdrawing the hydrogen gas from said vessel;

said engine further comprising:

an oxygen gas generator;

a burner for combusting hydrogen gas from said hydrogen gas generator and oxygen gas from said oxygen gas generator to generate superheated steam;

a turbine for receiving the superheated steam products of combustion from the burner and producing power therefrom and exhausting lower energy steam; and a condenser for receiving the lower energy steam from said turbine and changing its state into water;

said feedwater pump means also being operable for cycling the water through said engine.

2. A Rankine cycle engine as set forth in claim 1 wherein said feedwater pump means is operable for maintaining a sufficiently large mass flow of the reactant through said nozzle to assure no diminution thereof resulting from the formation thereon of fuel and chemical compounds of the fuel.

3. A Rankine cycle engine as set forth in claim 1 including means for purging the interior of said vessel with an inert gas.

4. A Rankine cycle engine as set forth in claim 3 wherein said purging means includes means for imparting an argon atmosphere to the interior of said vessel.

5. Apparatus for generating hydrogen gas comprising:

an enclosed vessel sealingly containing a charge of fuel selected from the group consisting of lithium, and alloys of lithium and aluminum, and alloys of lithium and aluminum and lithium hydroxide, and alloys of lithium and lithium hydroxide; means capable of heating the charge of fuel within said vessel to a temperature at which the fuel is molten without any introduction of water to said vessel and exhibits a surface;

pump means;

nozzle means within the vessel directed at the surface of the molten fuel for spraying reactant consisting of water from said pump means that provides sufficient pressure to cause the reactant to penetrate the surface thereof and cause agitation of the molten mass of fuel resulting in the production of hydrogen gas and heat; and means for withdrawing the hydrogen gas and heat from said vessel.

6. Apparatus for generating hydrogen gas as set forth in claim 5 including:

means for purging the interior of said vessel with an inert gas.

7. Apparatus for generating hydrogen gas as set forth in claim 6 wherein said purging means includes means for imparting an argon atmosphere to the interior of said vessel.

8. Apparatus for generating hydrogen gas as set forth in claim 5 wherein said pump means is operable to maintain a sufficiently large mass flow of the reactant through the nozzle to assure no diminution thereof resulting from the formation thereon of fuel and chemical compounds of the fuel.

9. Apparatus for generating hydrogen gas as set forth in claim 5 including:

means for filtering the hydrogen gas before it enters said withdrawing means to remove therefrom oxides and hydroxides of lithium and aluminum which are produced from the reaction in said vessel between the molten fuel and the reactant.

10. A hydrogen oxygen fuel cell system comprising:

a hydrogen gas generator including:

an enclosed vessel containing a charge of fuel selected from the group consisting of lithium, and alloys of lithium and aluminum and alloys of lithium and aluminum and lithium hydride, and alloys of lithium and lithium hydride;

means capable of heating the charge of fuel within said vessel to a temperature at which the fuel is molten without any introduction of water to said vessel;

feedwater pump means for introducing to said vessel for reaction with the charge of fuel a reactant consisting of water resulting in the production of hydrogen gas and heat, said introducing means including a nozzle directed at the surface of the molten fuel with sufficient pressure that the reactant penetrates the surface thereof and causes agitation of the molten mass of fuel; and tubing means for withdrawing the hydrogen gas from said vessel;

said hydrogen oxygen fuel cell system further comprising:

an oxygen gas generator;

a fuel cell stack for receiving hydrogen gas from said hydrogen gas generator and oxygen gas from said oxygen gas generator, said fuel cell stack operable to generate electricity and produce water as a result of the electrochemical reaction of the hydrogen gas and oxygen gas;

a heat exchanger for receiving water from said fuel cell stack and reducing the temperature of the water to an ambient level; and said feedwater pump means also being operable for cycling the water through said fuel cell system.

11. A fuel cell system as set forth in claim 10 including means for purging the interior of said vessel with an inert gas.

12. A fuel cell system as set forth in claim 11 wherein said purging means includes means for imparting an argon atmosphere to the interior of said vessel.

13. A fuel cell system as set forth in claim 10 wherein said feedwater pump means is operable for maintaining a sufficiently large mass flow of the reactant through said nozzle to assure no diminution thereof resulting from the formation thereon of fuel and chemical compounds of the fuel.

14. Apparatus for generating hydrogen gas comprising:

an enclosed pressure vessel sealingly containing a charge of fuel selected from the group consisting of lithium, and alloys of lithium and aluminum, and alloys of lithium and aluminium and lithium hydride, and alloys of lithium and lithium hydride;

means capable of heating the charge of fuel within said pressure vessel to a temperature at which the fuel is molten without any introduction of water to said vessel and exhibits a surface;

first tubing for injecting reactant water in said pressure vessel;

an intake external of said pressure vessel for directing flow of water into said first tubing;

pump means;

nozzle means on said first tubing within said pressure vessel directed at the surface of the molten fuel for spraying a reactant consisting of water from said pump means that provides sufficient pressure to cause the reactant to penetrate the surface thereof and cause agitation of the molten mass of fuel resulting in the production of hydrogen gas and heat; and means for withdrawing the hydrogen gas from said pressure vessel;

second tubing for directing flow of cooling water to and away from said pressure vessel;

an intake external of said pressure vessel for directing flow of cooling water into said second tubing; and an outlet external of said pressure vessel for withdrawing steam from said second tubing.

15. Apparatus for generating hydrogen gas as set forth in claim 14 wherein said pressure vessel includes an outer wall; and wherein said second tubing is integral with said outer wall.

16. Apparatus for generating hydrogen gas as set forth in claim 14 wherein said second tubing includes a coil within said pressure vessel.

17. Apparatus for generating hydrogen gas as set forth in claim 14 wherein said heating means includes a plurality of electric band and strip heaters clamped on the outside of said pressure vessel.

18. Apparatus as set forth in claim 14 wherein, prior to the heating operation, the charge of fuel is solid and has at least one upstanding tubular bore formed therein; and including:

a pyrotechnic device mounted in each upstanding tubular bore for producing a hot spot when ignited whereat the upstanding bore exhibits a molten surface having a temperature in excess of about 500° F.;

a source of $SF_6$ gas and liquid; and injector means for introducing said $SF_6$ gas and liquid into each tubular bore and onto the hot spot at a critical flow rate thereby raising the temperature of the entire charge of fuel to the range of about 600° F. to about 1500° F.

19. Apparatus as set forth in claim 18 wherein the charge of fuel exhibits a solid upper surface when the charge of fuel is solidified;

wherein said pyrotechnic device includes:

a measured amount of aluminum powder and $KClO_4$ wrapped in aluminum foil and surrounded by aluminum mesh screening;

an electric match embedded in said measured amount of aluminum powder and $KClO_4$;

an EMF source for energizing said electric match; and igniter wire leads extending to said electric match from said EMF source; and.

wherein said injector means includes:

a sleeve slidably and engageably received in an upper region of the upstanding tubular bore and extending between an upper rim and a lower rim;

an aluminum cover attached to said upper rim of said sleeve;

fastening means for attaching said aluminum cover to the solid upper surface of the charge of fuel before the heating operation commences; and a conduit extending between said source of $SF_6$ gas and liquid and terminating at a nozzle for directing the $SF_6$ gas and liquid onto the hot spot at the critical flow rate.

20. A process for generating hydrogen gas comprising the steps of:

(a) containing a charge of solid fuel selected from the group consisting of lithium, and alloys of lithium and aluminum, and alloys of lithium and aluminum and lithium hydride, and alloys of lithium and lithium hydride in an enclosed pressure vessel defining a single chamber;

(b) sealing the pressure vessel;

(c) heating the charge of solid fuel within the pressure vessel to a temperature at which the fuel is a molten mass and exhibits a surface;

(d) introducing to the pressure vessel for reaction with the molten mass of fuel within the pressure vessel a reactant consisting of water resulting in the production of hydrogen gas and heat, said step of introducing a reactant including the steps of (i) spraying the reactant through a nozzle directed at the surface of the molten fuel such that the reactant penetrates the surface thereof and causes agitation of the molten mass of fuel;

(ii) performing a first phase reaction which produces LiH and a first quantity of heat; and (iii) performing a second phase reaction which produces $H_2$ and a second quantity of heat, substantially less than the first quantity of heat; and (e) withdrawing the hydrogen gas and heat from the pressure vessel.

21. A process for generating hydrogen gas as set forth in claim 20 wherein step (d)(i) is performed according to a stoichiometric reaction equation, as follows:

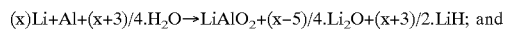

wherein step (d)(iii) is performed according to a stoichiometric reaction equation defining operations performed at elevated pressures in excess of about 100 psia, as follows:

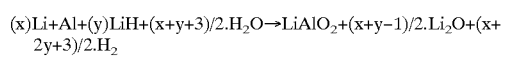

where x=the stoichiometric coefficient for Li (lithium) normalized by the coefficient for Al (aluminum);

where y=the stoichiometric coefficient for LiH (lithium hydride) normalized by the coefficient for Al (aluminum); and where y (LiH) and x (Li) are in the molar ratio range of about 1:1 to about 2:1.

22. A process for generating hydrogen gas as set forth in claim 20 wherein step (d) (iii) is initiated when the molar ratio of LiH and Li reaches a point in the range between about 1:1 and about 2:1.

23. A process for generating hydrogen gas comprising the steps of:

(a) introducing into a pressure vessel defining a single chamber a molten charge of fuel selected from the group consisting of lithium, and alloys of lithium and aluminum, and alloys of lithium and aluminum and lithium hydride, and alloys of lithium and lithium hydride;

(b) allowing the charge of fuel to solidify;

(c) forming at least one upstanding tubular bore in the solidified charge of fuel extending downwardly from an upper surface thereof;

(d) inserting a pyrotechnic device into each upstanding tubular bore;

(e) sealing the pressure vessel against further introduction of the fuel into the pressure vessel;

(f) igniting the pyrotechnic device to produce a hot spot in the upstanding bore whereat the upstanding bore exhibits a molten surface having a temperature in excess of about 500° F.;

(g) introducing a flow of $SF_6$ gas and liquid into each upstanding tubular bore and onto the hot spot produced in step (f) at a critical flow rate thereby raising the temperature of the entire charge of fuel to the range of about 600° F. to about 1500° F. such that the entire charge of fuel is a molten mass and exhibits a surface; and (h) introducing to the pressure vessel for reaction with the molten mass of fuel within the pressure vessel a reactant consisting of water resulting in the production of hydrogen gas and heat, said step of introducing a reactant including the step of spraying the reactant through a nozzle directed at the surface of the molten fuel such that the reactant penetrates the surface thereof and causes agitation of the molten mass of fuel; and (i) withdrawing the hydrogen gas and heat from the pressure vessel.

24. A process for generating hydrogen gas as set forth in claim 23

(j) wherein the pyrotechnic device includes a measured amount of $KClO_4$ and aluminum powder located in the upstanding bore in an amount in the range of about 0.75 gr. to about 1.5 gr.

25. A process for generating hydrogen gas comprising the steps of:

(a) introducing into a pressure vessel defining a single chamber a molten charge of fuel selected from the group consisting of lithium, and alloys of lithium and aluminum, and alloys of lithium and aluminum and lithium hydride, and alloys of lithium and lithium hydride;

(e) sealing the pressure vessel;

(f) externally heating the charge of solid fuel within the pressure vessel to a temperature at which the fuel is a molten mass and exhibits a surface;

(g) introducing to the pressure vessel for reaction with the molten mass of fuel within the pressure vessel a reactant consisting of water resulting in the production of hydrogen gas and heat, said step of introducing a reactant including the step of spraying the reactant through a nozzle directed at the surface of the molten fuel such that the reactant penetrates the surface thereof and causes agitation of the molten mass of fuel; and (h) withdrawing the hydrogen gas and heat from the pressure vessel.

* * * * *